US011043686B2

(12) United States Patent
Wang et al.

(10) Patent No.: US 11,043,686 B2
(45) Date of Patent: Jun. 22, 2021

(54) SYSTEMS AND METHODS OF LONG-DURATION ENERGY STORAGE AND REGENERATION OF ENERGY-BEARING REDOX PAIRS

(71) Applicant: BATTELLE MEMORIAL INSTITUTE, Richland, WA (US)

(72) Inventors: Wei Wang, Kennewick, WA (US); Dongping Lu, Richland, WA (US); Yuyan Shao, Richland, WA (US); Qian Huang, Richland, WA (US); Litao Yan, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 291 days.

(21) Appl. No.: 15/988,192

(22) Filed: May 24, 2018

(65) Prior Publication Data

US 2018/0269515 A1    Sep. 20, 2018

Related U.S. Application Data

(63) Continuation-in-part of application No. 15/004,717, filed on Jan. 22, 2016, now Pat. No. 10,950,883.
(Continued)

(51) Int. Cl.
*H01M 8/18* (2006.01)
*B01J 19/12* (2006.01)
(Continued)

(52) U.S. Cl.
CPC ........... *H01M 8/188* (2013.01); *B01J 19/122* (2013.01); *C25B 1/04* (2013.01); *C25B 9/73* (2021.01);
(Continued)

(58) Field of Classification Search
None
See application file for complete search history.

(56) References Cited

U.S. PATENT DOCUMENTS 4,262,066 A    4/1981    Brenneman et al.
4,460,444 A    7/1984    Maskalick
(Continued)

FOREIGN PATENT DOCUMENTS

JP    2001-233602    8/2001
JP    2011510466 A    *    3/2011
(Continued)

OTHER PUBLICATIONS

English translation of JP2011510466 (Year: 2011).*
(Continued)

*Primary Examiner* — Lucas J. O'Donnell
(74) *Attorney, Agent, or Firm* — Wells St. John P.S.

(57) ABSTRACT

Described herein are systems and methods of storing and delivering electrical using hydrogen at low-cost and for long-durations. The systems and methods use energy-bearing redox pairs that electrochemically bear energy through decoupled hydrogen and oxygen consumption and/or evolution reactions, which are typically associated with fuel cells. Each species of the energy-bearing redox pair is associated with a standard electrode potential within a water electrolysis voltage window for the electrolyte solution. Electrical energy delivery, hydrogen generation, electrolyte regeneration, or combinations thereof can be performed by logically or physically separated unit operations in a continuous manner, batch manner, or semi-batch manner facilitated by the energy-bearing redox pair.

12 Claims, 4 Drawing Sheets

Related U.S. Application Data (60) Provisional application No. 62/612,849, filed on Jan. 2, 2018, provisional application No. 62/106,641, filed on Jan. 22, 2015.

(51) Int. Cl.
  H01M 8/04858 (2016.01)
  H01M 8/04276 (2016.01)
  C25B 1/04 (2021.01)
  C25B 9/73 (2021.01)

(52) U.S. Cl.
  CPC ... *H01M 8/04276* (2013.01); *H01M 8/04925* (2013.01); *H01M 8/18* (2013.01); *H01M 8/186* (2013.01); *B01J 2219/0877* (2013.01); *H01M 2250/10* (2013.01); *Y02B 90/10* (2013.01); *Y02E 60/36* (2013.01); *Y02E 60/50* (2013.01)

(56) References Cited

U.S. PATENT DOCUMENTS

| | | | |
|---|---|---|---|
| 4,608,137 | A | 8/1986 | Vaughan et al. |
| 4,786,567 | A | 11/1988 | Skyllas-Kazacos et al. |
| 5,250,158 | A | 10/1993 | Kaneko et al. |
| 5,711,865 | A | 1/1998 | Caesar |
| 6,063,258 | A | 5/2000 | Sayama et al. |
| 6,093,501 | A | 7/2000 | Werth |
| RE36,985 | E | 12/2000 | Trainham, III et al. |
| 6,737,189 | B1 | 5/2004 | Vandayburg et al. |
| 7,754,183 | B2 | 7/2010 | Keskar et al. |
| 8,628,880 | B2 | 1/2014 | Li et al. |
| 8,771,856 | B2 | 7/2014 | Li et al. |
| 9,023,529 | B2 | 5/2015 | Liu et al. |
| 9,123,931 | B2 | 9/2015 | Li et al. |
| 9,130,218 | B2 | 9/2015 | Wang et al. |
| 9,214,885 | B1 | 12/2015 | Wang et al. |
| 9,236,620 | B2 | 1/2016 | Li et al. |
| 9,406,960 | B2 | 8/2016 | Xiao et al. |
| 9,421,521 | B2 | 8/2016 | Danilovic et al. |
| 9,543,609 | B2 | 1/2017 | Amstutz et al. |
| 2004/0241552 | A1 | 12/2004 | Skyllas-Kazacos |
| 2009/0061267 | A1* | 3/2009 | Monzyk ............ C01B 13/0222 429/458 |
| 2010/0310941 | A1 | 12/2010 | Kumta et al. |
| 2011/0014532 | A1 | 1/2011 | Knuckey et al. |
| 2011/0086247 | A1* | 4/2011 | Keshavarz .......... H01M 4/8803 429/9 |
| 2011/0195342 | A1 | 8/2011 | Luo et al. |
| 2011/0212384 | A1 | 9/2011 | Luo et al. |
| 2012/0077068 | A1 | 3/2012 | Wang et al. |
| 2013/0273459 | A1 | 10/2013 | Xu et al. |
| 2014/0170511 | A1 | 6/2014 | Tolmachev |
| 2014/0234536 | A1 | 8/2014 | Xu et al. |
| 2014/0234735 | A1 | 8/2014 | Zhang |
| 2015/0147673 | A1 | 5/2015 | Li et al. |
| 2017/0179558 | A1* | 6/2017 | McKone ............... H01L 31/053 |

FOREIGN PATENT DOCUMENTS

| | | |
|---|---|---|
| WO | WO 89/05363 | 6/1989 |
| WO | WO 2008/123911 | 10/2008 |

OTHER PUBLICATIONS

Bloor, L. G., et al., Solar-Driven Water Oxidation and Decoupled Hydrogen Production Mediated by an Electron-Coupled-Proton Buffer, Journal of the American Chemical Society, 138, 2016, 6707-6710.
Chen, L., et al., Separating hydrogen and oxygen evolution in alkaline water electrolysis using nickel hydroxide, Nature Communications, 2016, 1-8.
Palumbo, R., et al., Solar thermal decoupled water electrolysis process I: Proof of Concept, Chemical Engineering Science, 84, 2012, 372-380.
Rausch, B., et al., Decoupled catalytic hydrogen evolution from a molecular metal oxide redox mediatior in water splitting, Science, 345, 2014, 1326-1331.
Zhang, S. et al., Electrostatic Self-Assembly of a Pt-around-Au Nanocomposite with High Activity towards Formic Acid Oxidation, Agnew. Chem. Int. Ed., 49, 2010, 2211-2214.
Aaron et al., "Dramatic Performance Gains in vanadium Redox Flow Batteries Through Modified Cell Architecture", Journal of Power Sources vol. 206, 2012, Netherlands, pp. 450-453.
Alon et al., "Fesibility Study of Hydrogen/Iron Redox Flow Cell for Grid-Storage Applications", Journal of Power Sources vol. 240, 2013, Netherlands, pp. 417-420.
Antolini et al., "Effects of Geometric and Electronic Factors on ORR Activity of Carbon Supported Pt-Co Electrocatalysts in PEM Fuel Cells", International Journal of Hydrogen Energy vol. 30, 2005, United Kingdom, pp. 1213-1220.
Ayers et al., "(Industrial Electrochemistry & Electrochemical Engineering Division NET Award) Development of Large Scale Commercial PEM Electrolysis", ECS Meeting Abstracts 1205-1205, available online at http://ma.ecsdl.org/content/MA2015-01/16/1205.short, 2015, 2 pages.
Ayers et al., "Characterization of Iron (VI) Compounds and Their Discharge Products in Strongly Alkaline Electrolyte", Journal of the Electrochemicl Society vol. 152, 2005, United States, pp. A467-A473.
Ayers et al., "Research Advances Towards Low Cost, High Efficincy PEM Electrolysis", ECS Transactions vol. 33, 2010, United States, pp. 3-15.
Ayers et al., "Characterization of Anion Exchange Membrane Technology for Low Cost Electrolysis Modeling and System Studies", ECS Transactions vol. 45, 2013, United States, pp. 121-130.
Ayers et al., "Efficient Generation of High Energy Density Fuel from Water", ECS Transactions vol. 41, 2012, United States, pp. 27-38.
Ayers et al., "Fueling Vehicles with Sun and Water", Photoelectrochemical Cells and Biological Devices, ECS Transactions vol. 50, 2013, United States, pp. 35-46.
Ayers et al., "Hydrogen Infrastructure Challenges and Solutions", ECS Transactions vol. 41, 2012, United States, pp. 75-83.
Ayers et al., "Recent Advances in Cell Cost and Efficiency for PEM-Based Water Electrolysis", ECS Transactions vol. 41, 2012, United States, pp. 15-22.
Ayers, "Low-Noble-Metal-Content Catalysts/Elecfrodes for Hydrogen Production by Water Electrolysis", DOE Annual Merit Review, available online at http://www.hydrogen.energy.gov/pdfs/review15/pd098_ayers_2015_o.pdf, 2015, 24 pages.
Bashyam et al., "A Class of Non-Precious Metal Composite Catalysts for Fuel Cells", Nature vol. 443, 2006, United Kingdom, pp. 63-66.
Bullis, "Hydrogen Storage Could Be Key to Germany's Energy Plans", MIT Technology Review, available online at https://www.technologyreview.com/s/427360/hydrogen-storage-could-be-key-to-germanys-energy-plans/, Mar. 2012, 4 pages.
Candelaria et al., "Nanostructured Carbon for Energy Storage and Conversion", Nano Energy vol. 1, 2012, Netherlands. pp. 195-220.
Chang et al., "Activity Stability Relationship in the Surface Electrochemistry of the Oxygen Evolution Reaction", Faraday Discussions vol. 176, 2014, United Kingdom, pp. 125-133.
Chang et al., "Functional Links Between Stability and Reactivity of Strontium Ruthenate Single Crystals During Oxygen Evolution", Nature Communications vol. 5, 2014, United Kingdom, 9 pages.
Chen et al., "Highly Crystalline Multimetallic Nanoframes with Three-Dimensional Electrocatalytic Surfaces", Science vol. 343, 2014, United States, pp. 1339-1343.
Crawford et al., "Comparative Analysis for Various Redox Flow Batteries Chemistries using a Cost Performance Model", Journal of Power Sources vol. 293, 2015, Netherlands, pp. 388-399.

(56) References Cited

OTHER PUBLICATIONS

Danilovic et al., "Activity-Stability Trends for the Oxygen Evolution Reaction on Monometallic Oxides in Acidic Environments", Journal of Physical Chemistry Letters vol. 5, 2014, United States, pp. 2474-2478.
Danilovic et al., "Using Surface Segregation to Design Stable Ru—Ir Oxides for the Oxygen Evolution Reaction in Acidic Environments", Angewandte Chemie vol. 126, 2014, United Kingdom, pp. 14240-14245.
Debe et al., "Initial Performance and Durability of Ultra-Lowe Loaded NSTF Electrodes for PEM Electrolyzers", Journal of The Electrochemical Society vol. 159, 2012, United States, pp. K165-K176.
Department of Energy, "Grid Energy Storage", U.S. Department of Energy, available online at http://energy.gov/sites/prod/files/2014/09/f18/Grid%20Energy%20Storage%20December%202013.pdf, 2013, 67 pages.
European Wind and Energy Association, "Wind in Power: 2011 European Statistics", available online at http://www.ewea.org/fileadmin/files/library/publications/statistis/Wind_in_power_2011_European_statistics.pdf, Feb. 2012, 11 pages.
Fachverband Biogas e.V., "Biogas Segment Statistics 2014", available online at http://www.biogas.org/edcom/webfvb.nsf/id/DE_Branchenzahlen/, 2014, 2 pages.
Fajardo et al., "New Approaches to Solar-Energy Conversion Using Si/Liquid Junctions", Solar Energy Materials and Solar Cells, vol. 38, 1995, Netherlands, pp. 279-303.
Fu et al., "An Integral Proton Conductins SOFC for Simultaneous Productions of Ethylene and Power from Ethane", Chemical Communications vol. 46, 2010, United Kingdom, pp. 2052-2054.
Gasteiger et al., "Just a Dream—Or Future Reality?", Science vol. 324, 2009, United States, pp. 48-49.
Greeley et al., "The Road from Animal Electricity to Green Energy: Combining Experiment and Theory in Electrocatalysis", Energy & Environmental Science vol. 5, 2012, United Kingdom, pp. 9246-9256.
Han et al., "Diffusional Motion of Redox Centers in Carbonate Electrolytes", Journal of Chemical Physics vol. 141, 2014, United States, 8 pages.
Herranz et al., "Unveiling N-Protonation and Anion-Binding Effects on Fe/N/C Catalysts for O2 Reduction in Proton-Exchange-Membrane Fuel Cells", Journal of Physical Chemistry C vol. 15, 2011, United States, pp. 16087-16097.
James et al., "PEM Electrolysis H2A Production Case Study Documentation", Department of Energy, available online at http://www.hyrogen.energy.gov/pdfs/h2a_pem_electrolysis_case_study_documentation.pdf, 2013, 27 pages.
Jaouen et al., "Recent Advances in Non-Precious Metal Catalysis for Oxygen-Reduction Reation in Polymer Electrolyte Fuel Cells", Energy and Environmental Science vol. 4, 2011, United Kingdom, pp. 114-130.
Ji et al., "Controlling SEI Formation on SnSb-Porous Carbon Nanofibers for Improved Na Ion Storage", Advanced Materials vol. 26, 2014, United Sttes, pp. 2901-2908.
Kim et al., "Chloride Supporting Electrolytes for All-Vanadium Redox Flow Batteries", Physical Chemistry Chemical Physics vol. 13, 2011, United Kingdom, pp. 18186-18193.
Kim et al., "1 kW/1kWh Advanced Vanadium Redox Flow Battery Utilitzing Mixed Acid Electrolytes", Journal of Power Sources vol. 237, 2013, Netherlands, pp. 300-309.
Koh et al., "Activity-Stability Relationships of Ordered and Disordered Alloy Phases of Pt3Co Electrocatalysts for the Oxygen Reduction Reaction (ORR)", Electrochimica Acta vol. 52, 2007, United Kingdom, pp. 2765-2774.
Kou et al., "Stabilization of Electrocatalytic Metal Nanoparticles at Metal-Metal Oxide-Graphene Triple Junction Points", Journal of the American Chemical Society vol. 133, 2011, United States, pp. 2541-2547.
Lezama et al., "Spectroscopic Evidence on the Interaction of Prephenate, a Shikimate Pathway Intermediate, with Oxidovanadium(IV) Species", Inorganica Chimica Acta vol. 363, 2010, Netherlands, pp. 1593-1596.
Li et al., "A Stable Vanadium Redox-Flow Battery with High Energy Density for Large-scale Energy Storage", Advanced Energy Materials vol. 1, 2011, Germany, pp. 394-400.
Li et al., "Ambipolar Zinc-Polyiodide Electrolyte for High Energy Density Aqueous Redox Flow Battery", Nature Communications vol. 6, 2015, United Kingdom, 8 pages.
Li et al., "Bismuth Nanoparticle Decorating Graphite Felt as a High-Performance Electrode for an All-Vanadium Redox Flow Battery". Nano Letters vol. 13, 2013, United States, pp. 1330-1335.
Li et al., "Nanorod Niobium Oxide as Powerful Catalysts for an all Vanadium Redox Flow Battery", Nano Letters vol. 14, 2013, United States, pp. 158-165.
Li et al., "Capacity Decay Mechanism of Microporous Separator-Based All-Vanadium Redox Flow Batteries and its Recovery", ChemSusChem vol. 7, 2014, Germany, pp. 577-584.
Li et al., "Fe/V Redox Flow Battery Electrolyte Investigation and Optimization", Journal of Power Sources vol. 229, 2013, Netherlands, pp. 1-5.
Litter, "Heterogeneous Photocatalysis: Transition Metal Ions in Photocatalytic Systems", Applied Catalysis B: Environmental vol. 23, 1999, Netherlands, pp. 89-114.
Long et al., "Electrochemical Characterization of High-Surface-Area Catalysts and Other Nanoscale Electroactive Materials at Sticky-Carbon Electrodes", Journal of Electroanalytical Chemistry vol. 522, 2002, Netherlands, pp. 58-65.
Luo et al., "Capacity Decay and Remediation of Nafion-Based All-Vanadium Redox Flow Batteries", ChemSusChem vol. 6, 2013, Germany, pp. 268-274.
Martin et al., "Time-Resolved Microwave Conductivity Part 2—Quantum-Sized TiO2 and the Effect of Adsorbates and Light Intensity on Charge-Carrier Dynamics", Journal of the Chemical Society, Faraday Transactions vol. 90, 1994, United Kingdom, pp. 3323-3330.
Menictas et al., "Evaluation of an NH4VO3-Derived Electrolyte for the Vanadium-Redox Flow Battery", Journal of Power Sources vol. 45, 1993, Netherlands, pp. 43-54.
Ohno et al., "Unique Effects of Iron(III) Ions on Photocatalytic and Photoelectrochemical Properties of Titanium Dioxide", Journal of Physical Chemistry B vol. 101, 1997, United States, pp. 6415-6419.
Paciok et al., "Sensivity Analysis of a PEM Electrolyser Cathode with Respect to the Platium and Nafion Loading", Electrochemical Society Meeting Abstracts 1562-1562, available online at http://ma.ecsdl.org/content/MA2015-01/26/1562.short, 2015, 2 pages.
Park et al., "Oxygen Electrocatalysts for Water Electrolyzers and Reversible Fuel Cells: Status and Perspective", Energy & Environmental Science vol. 5, 2012, United Kingdom, pp. 9331-9344.
Parrondo et al., "Degradation of Anion Exchange Membranes Used for Hydrogen Production by Ultrapure Water Electrolysis", Royal Society of Chemistry Adv. 2014, 4, United Kingdom, pp. 9875-9879.
Perry et al., "High Power Density Redox Flow Battery Cells", ECS Transdactions vol. 53, 2013, United States, pp. 7-16.
Pomykal et al., "Measurement of Interfacial Charge Transfer Rate Constants at n-type InP/CH3OH Junctions", Journal of Physical Chemistry B vol. 101, 1997, United States, pp. 2476-2484.
Pomykal et al., "Stability of n-Si/CH3OH Contacts as Function of the Reorganization Energy of the Electron-Donor", Journal of Physical Chemistry vol. 99, 1995, United States, pp. 8302-8310.
Pomykal et al., "Theoretical and Experimental Upper Bounds on Interfacial Charge-Transfer Rate Constants Between Semiconducting Solids and Outer-Sphere Redox Couples", Journal of Physical Chemistry vol. 100, 1996, United States, pp. 3652-3664.
Rahman et al., "Vanadium Redox Battery: Positive Half-Cell Electrolyte Studies", Journal of Power Sources vol. 189, 2009, Netherlands, pp. 1212-1219.
Ramaswamy et al., "Fundamental Mechanistic Understanding of Electrocatalysis of Oxygen Reduction on Pt and Non-Pt Surfaces: Acid Versus Alkaline Media", Adances in Physical Chemistry, 2012, Egypt, 17 pages.
Reiche et al., "Heterogeneous Photocatalytic and Photosynthetic Deposition of Copper on TiO2 and WO3 Powders", Journal of Physical Chemistry vol. 83, 1979, United States, pp. 2248-2251.

(56) References Cited

OTHER PUBLICATIONS

Roller et al., "Flame-Based Processing as a Practical Approach for Manufacturing Hydrogen Evolution Electrodes", Journal of Power Sources, vol. 271, 2014, Netherlands, pp. 366-376.
Sauve et al., "Dye Sensitizstion of Nanocrystalline Titanium Dioxide with Osmium and Ruthenium Polypyridyl Complexes", Journal of Physical Chemistry B vol. 104, 2000, United States, pp. 6821-6836.
Sauve et al., "High Quantum Yield Sensitization of Nanocrystalline Titanium Dioxide Photoelectrodes with cis-Dicyanobis(4,4'-dicarboxy-2,2'-bipyridine)osmium(II) of Tris(4,4'-dicarboxy-2,2'-bipyridine-)osmium(II) Complexes", Journal of Physical Chemistry B vol. 104, 2000, United States, pp. 3488-3491.
Sciafani et al., "N2 Photoreduction and Phenol and Nitrophenol Isomers Photooxidation as Examples of Heterogeneous Photocatalytic Reactions", Research on Chemical Intermediates vol. 18, 1993, Germany, pp. 211-226.
Sciafani et al., "Photocatalytic Degradaton of Phenol in Aqueous Polycrystalline TiO2 Dispersions: The Influence of Fe3+, Fe2+ and Ag+ on the Reaction Rate", Journal of Photochemistry and Photobiology A: Chemistry vol. 56, 1991, Netherlands, pp. 113-123.
Seley et al., "Combinatorial Search for Improved Metal Oxide Oxygen Evolution Electrocatalysts in Acidic Electrolytes", ACS Combinatorial Science vol. 15(2), 2013, United States, pp. 82-89.
Shao et al., "Electrocatalysts for Nonaqueous Lithium Air Batteries: Status, Challenges and Perspective", ACS Catalysis vol. 2, 2012, United States, pp. 844-857.
Shao et al., "Electrochemical Investigation of Polyhalide Ion Oxidation-Reduction on Carbon Nanotube Electrodes for Redox Flow Batteries", Electrochemistry Communications vol. 11, 2009, Netherlands, pp. 2064-2067.
Shao et al., "Facile and Controllable Electrochemical Reduction of Graphene Oxide and its Applications", Journal of Materials Chemistry vol. 20, 2009, United Kingdom, pp. 743-748.
Shao et al., "Highly Reversible Mg Insertion in Nanostructured Bi for Mg Ion Batteries", Nano Letters vol. 14, 2014, United States, pp. 255-260.
Shao et al., "Making Li-Air Batteries Rechargeable: Material Challenges", Advanced Functional Materials vol. 23, 2013, United Kingdom, pp. 987-1004.
Shao et al., "Nitrogen-Doped Mesoporous Carbon for Energy Storage in Vanadium Redox Flow Batteries", Journal of Power Sources vol. 195, 2010, Netherlands, pp. 4375-4379.
Shao et al., "Novel Catalyst Support Materials for PEM Fuel Cells: Current Status and Future Prospects", Journal of Materials Chemistry vol. 19, 2009, United Kingdom, pp. 46-59.
Shao et al., "The Corrosion of PEM Fuel Cell Catalyst Supports and its Implications for Developing Durable Catalysts", Electrochimica Acta vol. 54, 2009, United Kingdom, pp. 3109-3114.
Shao et al., "Surface Driven Sodium Ion Energy Storage in Nanocellular Carbon Foams", Nano Letters vol. 13, 2013, United States, pp. 3909-3914.
Shreve et al., "Limites on the Corrosion Rate of Si Surfaces in Contact with CH3OH-Ferrocene+/0 and CH3OH-1,1'-Dimethylferrocene+/0 Solutions", Journal of Physical Chemistry vol. 99, 1995, United States, pp. 5575-5580.
Stamenkovic et al., "Improved Oxygen Reduction Activity on Pt3Nl(111) Via Increased Surface Site Availability", Science vol. 315, 2007, United States, pp. 493-497.
Stephenson et al., "Electrochemical Model of the Fe/V Redox Flow Battery", Journal of the Electrochemical Society vol. 159, 2012, United States, pp. A1993-A2000.
Strmcnik et al., "Improving the Hydrogen Oxidation Reaction Rate by Promotion of Hydroxyl Adsorption", Nature Chemistry vol. 5, 2013, United Kingdom, pp. 300-306.
Subbaraman et al., "Enhancing Hydrogen Evolution Activity in Water Splitting by Tailoring Li+-Ni(OH)2-Pt Interfaces", Science vol. 334, 2011, United States, pp. 1256-1260.
Toops et al., "Evaluation of Nitrided Titanium Separator Plates or Proton Exchange Membrane Electrolyzer Cells", Journal of Power Sources vol. 272, 2014, Netherlands, pp. 954-960.
Tucker et al., "Performance and Cycling of the Iron-Ion/Hydrogen Redox Flow Cell with Various Catholyte Salts", Journal of Applied Electrochemistry vol. 43, 2013, Netherlands, pp. 637-644.
Tucker et al., "Optimization of the Iron-Ion/Hydrogen Redox Flow Cell with Iron Chloride Catholyte Salt", Journal of Power Sources vol. 245, 2014, Netherlands, pp. 691-697.
Tylus et al., "Elucidating Oxygen Reduction Active Sites in Pyrolyzed Metal-Nitrogen Coordinated Non-Precious-Metal Electrocatalyst Systems", Journal of Physical Chemistry C vol. 118, 2014, United States, pp. 8999-9008.
Vijayakumar et al., "Elucidating the Higher Stability of Vanadium(V) Cations in Mixed Acid Based Redox Flow Battery Electrolytes", Journal of Power Sources vol. 241, 2013, Netherlands, pp. 173-177.
Viswanathan et al. "Cost and Performance Model for Redox Flow Batteries", Journal of Power Sources vol. 247, 2014, Netherlands, pp. 1040-1051.
Wang et al., "A New Hybrid Redox Flow Battery with Multiple Redox Couples", Journal of Power Sources vol. 216, 2012, Netherlands, pp. 99-103.
Wang et al., "A New Redox Flow Battery using Fe/V Redox Couples in Chloride Supporting Electrolyte", Energy & Environmental Science, 2011, United Kingdom, pp. 4068-4073.
Wang et al.,"Li-Ion Battery wiht LiFePO4 Cathode and Li4Ti5O12 Anode for Stationary Energy Storage", Metallurgical and Materials Transactions A: Physical Metallurgy and Materials Science vol. 44A, 2013, United States, pp. 21-25.
Wang et al., "Ultralow Charge-Transfer Resistance with Ultralow Pt Loading for Hydrogen Evolution and Oxidation using Ru@Pt Core-Shell Nanocatalysts", Sci. Rep. 5, 2015, United States, 8 pages.
Ward et al., "Photocurrent Enhancement via Trapping of Photogenerated Electrons of TiO2 Particles", Journal of Physical Chemistry vol. 86, 1982, United States, pp. 3599-3605.
Wei et al., "Performance Evaluation of Microporous Separator in Fe/V Redox Flow Battery", ECS Transactions vol. 45, 2013, United States, pp. 17-24.
Wei et al., "Polyvinyl Chloride/Silica Nnoporous Composite separator for All-Vanadium Redox Flow Battery Applications", Journal of the Electrochemical Society vol. 160, 2013, United States, pp. A1215-A1218.
Wei et al., "TEMPO-Based Catholyte for High Energy Density Nonaqueous Redox Flow Batteries", Advanced Materials vol. 26, 2014, United States, pp. 7649-7653.
Wei et al., "Towards High-Performance Nonaqueous Redox Flow Electrolyte through Ionic Modification of Active Species", Advanced Energy Materials vol. 5, 2015, Germany, 7 pages.
Wei et al., "Nanoporous Polytetrafluoroethylene/Silica Composite Separator as a High-Performance All-Vanadium Redox Flow Battery Membrane", Advanced Energy Materials vol. 3, 2013, Germany, pp. 1215-1220.
Wu et al., "High-Performance Electrocatalysts for Oxygen Reduction Derived from Polyaniline, Iron, and Cobalt", Science vol. 332, 2011, United States, pp. 443-447.
Xu et al., "Simply AlF-3-Treated Li4Ti5O12 Composite Anode Materials for Stable and Ultrahigh Power Lithium-Ion-Batteries", Journal of Power Sources vol. 236, 2013, Netherlands, pp. 169-174.
Zhang et al., "Effects of Additives on the Stability of Electrolytes for All-Vanadium Redox Flow Batteries", Journal of Applied Electrochemistry vol. 41, 2011, Netherlands, pp. 1215-1221.
Ellis et al., "Study of n-Type Semiconducting Cadmium Chalcogenide-Based Photoelectrochemical Cells Employing Polychalcogenide Electrolytes", Journal of the American Chemical Society vol. 99, No. 9, Apr. 1977, United States, pp. 2839-2848.
Maeda, "Z-Scheme Water Splitting Using Two Different Semiconductor Photocatalysts", ACS Catalysis vol. 3, No. 7, May 2013, United States, pp. 1486-1503.
Fatih, K., et al., Advancements in the Direct Hydrogen Redox Fuel Cell, Electrochemical and Solid-State Letters, 11, 2, 2008, B11-B15.

(56) References Cited

OTHER PUBLICATIONS

Han, "Photo-Electrochemical Hydrogen Production", Technical Report by MVSystems, Inc. for U.S. Dept. of Energy, Dec. 2013, available at http://osti.gov/biblio/1111421, 58 pages.
Kaneshiro et al., "Advances in Copper-Chalcopyrite Thin Films for Solar Energy Conversion", Solar Energy Materials and Solar Cells, vol. 94, No. 1, Jan. 2010, pp. 12-16.

* cited by examiner

SYSTEMS AND METHODS OF LONG-DURATION ENERGY STORAGE AND REGENERATION OF ENERGY-BEARING REDOX PAIRS

PRIORITY

This invention claims priority from and is a continuation-in-part of currently pending patent application Ser. No. 15/004,717, filed Jan. 22, 2016, which claims priority to U.S. Provisional Patent application No. 62/106,641, filed Jan. 22, 2015. This invention also claims priority to U.S. Provisional Patent Application No. 62/612,849, filed Jan. 2, 2018. The entirety of said applications are incorporated herein by reference.

ACKNOWLEDGEMENT OF GOVERNMENT SUPPORT

This invention was made with Government support under Contract DE-AC0576RL01830 awarded by the U.S. Department of Energy. The Government has certain rights in the invention.

FIELD

The present disclosure relates generally to electrical energy storage and delivery and more particularly to utilization of energy-bearing redox species to decouple hydrogen and oxygen evolution for long-duration electrical energy delivery.

BACKGROUND

Current stationary electrical energy storage systems are primarily being used to provide various functions that require four to six hours of storage time, including but not limited to integration of variable renewables, backup power during outages, and energy wholesale service. Hydrogen and fuel cells can find applications for even longer duration energy storage. Modern proton exchange membrane (PEM) electrolysis is a commercially mature technology with system simplicity and ease of maintenance due to its membrane design allowing for differential pressure operation and water as a single input. However, because of the high precious metal content, the aggressive high voltage environment at the anode, and the thick membranes used to ensure $H_2$ and $O_2$ separation, significant advances are still required in order to reduce the overall lifecycle cost to meet the demand in the energy market. As the role of stationary energy storage continues to increase on the grid energy market, so will the importance of lower cost and longer duration energy storage and delivery. Accordingly, a need exists for systems and methods of energy storage that minimize cost and extend storage time to practical durations for grid applications, including but not limited to eight hours or more. Such systems can provide long-duration energy storage for various applications to improve the electric grid resilience, to alleviate the need for rapid ramping due to increasing renewable penetration, to provide transmission & delivery deferral, and to provide electric service to micro or island grid.

SUMMARY

Disclosed herein are systems and methods for long-duration electrical energy delivery and regeneration of energy-bearing redox pairs. In one embodiment, a system of energy storage can comprise a first redox flow cell having a positive electrode side comprising an energy-bearing redox species dissolved in a liquid, energy-bearing, electrolyte solution, a negative electrode side comprising a $H^+/H_2$ half-cell, and a proton permeable membrane separating the positive electrode and negative electrode sides, the first redox flow cell having a hydrogen generation mode and an electrical energy delivery mode. The system can further comprise a first electrolyte regeneration cell comprising a reactor configured to react the liquid, energy-bearing, electrolyte solution comprising the energy-bearing redox species in a reduced state with an oxidizing agent to yield the energy-bearing redox species in an oxidized state. The energy-bearing redox species can be associated with a reversible redox reaction having a standard electrode potential within the water electrolysis voltage window for the electrolyte solution. As an example, the water electrolysis voltage window for highly acidic electrolyte solutions can be between 0 V and 1.23 V. The window can vary according to a Pourbaix diagram.

In certain embodiments, the system can further comprise a second electrolyte regeneration cell comprising a photo-reduction cell having a photo-sensitive reducing agent, wherein the photoreduction cell is configured to receive solar radiation, as well as a circulation sub-system configured to transfer a first, liquid, energy-bearing, electrolyte solution comprising the energy-bearing redox species in the oxidized state from the first redox flow cell to the photoreduction cell, and configured to transfer a second, liquid, energy-bearing, electrolyte solution comprising the energy-bearing redox species in the reduced state from the photoreduction cell to the first redox flow cell.

In certain embodiments, the system can further comprise a second electrolyte regeneration cell comprising a second redox flow cell having a negative electrode side comprising the energy-bearing redox species dissolved in the liquid, energy-bearing, electrolyte solution, a positive electrode side comprising a $H_2O/O_2$ half-cell, and a proton permeable membrane separating the positive electrode and negative electrode sides. The second redox flow cell can be configured to reduce the energy-bearing redox species and yield $O_2$. A circulation sub-system can be configured to transfer a first, liquid, energy-bearing, electrolyte solution comprising the energy-bearing redox species in the oxidized state from the first redox flow cell to the second, and configured to transfer a second, liquid, energy-bearing, electrolyte solution comprising the energy-bearing redox species in the reduced state from the second redox flow cell to the first. In certain embodiments, the circulation sub-system further comprises a first storage container configured to store a portion of the first liquid, energy-bearing, electrolyte solution and a second storage container configured to store a portion of the second liquid, energy-bearing, electrolyte solution.

In certain embodiments, the system can further comprise a storage vessel storing compressed hydrogen gas and operably connected to the first redox flow cell. Hydrogen produced by the system can be stored in the storage vessel. The storage vessel can also provide hydrogen to the first redox flow cell to facilitate long-duration energy delivery. In certain embodiments, the system can further comprise a controller operably connected to the first redox flow cell and configured to select between the energy delivery mode and the hydrogen generation mode based on an energy-market condition. In certain embodiments, the energy-market condition comprises price of electrical energy supply, electrical energy demand, power grid health, $H_2$ price, $H_2$ demand, time of day, weather conditions, or a combination thereof.

In certain embodiments, the energy-bearing redox species in the reduced and oxidized states comprise $Fe^{2+}$ and $Fe^{3+}$, respectively. In certain embodiments, the oxidizing agent comprises oxygen. In certain embodiments, the reactor comprises a flow reactor. In certain embodiments, the energy-bearing redox species comprises iodine, vanadium, bromine, chlorine, TEMPO, or a combination thereof. In certain embodiments, the electrolyte solution can further comprise a homogeneous catalyst. In certain embodiments, the system can be configured to operate in the energy delivery mode for a duration greater than or equal to 6 hours, 8 hours, 12 hours, 24 hours, or 48 hours.

In some embodiments, a method for long-duration energy storage comprises, in an electrical energy delivery mode, generating electrical energy in a first redox flow cell comprising a $H^+/H_2$ half-cell on a negative electrode side; reducing an energy-bearing redox species on a positive electrode side of the first redox flow cell, wherein the energy-bearing redox species is dissolved in a liquid, energy-bearing, electrolyte solution and is associated with a reversible redox reaction having a standard electrode potential within a water electrolysis voltage window for the electrolyte solution; and regenerating the liquid, energy-bearing electrolyte solution by reacting the energy-bearing redox species in a reduced state with an oxidizing agent in a reactor of a first electrolyte regeneration cell, thereby yielding the energy-bearing redox species in an oxidized state. In a hydrogen generation mode, the method comprises generating hydrogen on the negative-electrode side of the first redox flow cell and oxidizing the energy-bearing redox species on the positive-electrode side.

In certain embodiments, the energy-bearing redox species in the oxidized and reduced states comprises $Fe^{3+}$ and $Fe^{2+}$, respectively. In certain embodiments, said generating electrical energy further comprises generating electrical energy for a duration greater than or equal to 6 hours, 8 hours, 12 hours, 24 hours, or 48 hours. In certain embodiments, the method can further comprise selecting between the electrical energy delivery mode and the hydrogen generation mode based on an energy-market condition. In certain embodiments, the energy-market condition comprises price of energy supply, energy demand, power grid health, $H_2$ price, $H_2$ demand, time of day, weather conditions, or a combination thereof.

In certain embodiments, the hydrogen generation mode further comprises the steps of receiving solar radiation at a second electrolyte regeneration cell, which has a photoreduction cell comprising a photo-sensitive reducing agent; and regenerating the liquid, energy-bearing electrolyte solution by reducing the energy-bearing redox species from the oxidized state to the reduced state in the photoreduction cell. In certain embodiments, said generating hydrogen further comprises regenerating the liquid, energy-bearing electrolyte solution by reducing the energy-bearing redox species from the oxidized state to the reduced state on a negative-electrode side of a second redox flow cell and yielding $O_2$ on a positive electrode side comprising an $H_2O/O_2$ half-cell, wherein the first and second redox flow cells are decoupled for independent operation one from another.

In certain embodiments, the method can further comprise storing a portion of the liquid, energy-bearing, electrolyte solution comprising the energy-bearing redox species in the oxidized state and reduced state each in a separate storage container.

In some embodiments, a system for LDES can comprise a first redox flow cell having a hydrogen production mode and an electrical energy delivery mode. The first redox flow cell comprises negative electrode side comprising an $H^+/H_2$ half-cell; a positive electrode side comprising a $Fe^{2+}/Fe^{3+}$ half-cell and a liquid, energy-bearing electrolyte solution comprising $Fe^{2+}$, $Fe^{3+}$, or both dissolved therein; a first electrolyte-regeneration cell comprising a flow reactor with an oxygen port and configured to react oxygen with the liquid, energy-bearing electrolyte solution comprising $Fe^{2+}$ from the first redox flow cell in the electrical energy delivery mode and yield $Fe^{3+}$; and a second electrolyte-regeneration sub-system configured to reduce $Fe^{3+}$ from the liquid, energy-bearing electrolyte solution from the first redox flow cell in the hydrogen generation mode to $Fe^{2+}$. The second electrolyte-regeneration sub-system can comprise a second redox flow cell having a positive electrode side comprising an $H_2O/O_2$ half-cell, having a negative electrode side comprising a $Fe^{3+}/Fe^{2+}$ half-cell. The liquid, energy-bearing electrolyte solution comprises $Fe^{2+}$, $Fe^{3+}$, or both dissolved therein. The second electrolyte-regeneration sub-system in addition to the second redox flow cell, or as an alternative, can comprise a photoreduction cell having a photo-sensitive reducing agent, wherein the photoreduction cell is configured to receive solar radiation. The system can further comprise a controller operably connected to the first redox flow cell and configured to select between the hydrogen production mode and the electrical energy delivery mode based on an energy market condition. In certain embodiments, the energy market condition comprises price of electrical energy supply, electrical energy demand, power grid health, $H_2$ price, $H_2$ demand, time of day, weather conditions, or a combination thereof.

The purpose of the foregoing summary and the latter abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. Neither the summary nor the abstract is intended to define the invention of the application, which is measured by the claims, nor is it intended to be limiting as to the scope of the claims in any way.

DETAILED DESCRIPTION

The capital cost of typical stationary electrical energy storage systems can be calculated based on the combination of cost on energy capacity ($/kWh) and cost on rated power ($/kW). The inventors have determined that as the storage duration increases, the overall system cost approaches the energy cost of the system, which includes primarily the cost of energy bearing materials and the balance of plant (BOP) that is associated with the cost of containers, pumps, heat exchangers, pipes, concrete pads, site preparation, etc. Therefore, in traditional electrochemical energy storage systems, there is a stringent limitation on the selection of low-cost energy bearing materials with sufficient energy density to limit the BOP costs for long-duration energy storage (LDES) systems. Embodiments described herein can deliver energy from hydrogen at low-cost and for long-durations using energy-bearing redox pairs that electrochemically bear energy and facilitate decoupling of the HER (hydrogen evolution reaction)/HOR (hydrogen oxidation reaction) and OER (oxygen evolution reaction)/ORR (Oxygen reduction reaction) reactions, which are typically associated with fuel cells.

The embodiments can take advantage of the compressibility of hydrogen, the low cost of certain energy-bearing redox pairs, and/or the decoupling of HER/HOR and OER/ORR reactions to enable long-duration energy storage and delivery beyond current limitations associated with energy density and system size. Accordingly, the traditional paradigm of proportionally increasing energy bearing materials, volume, and footprint, in order to increase duration is bypassed. The problem of high-cost and/or under provided energy storage and delivery can be addressed by using a redox flow cell comprising a liquid, energy-bearing electrolyte solution in which at least one species of an energy-bearing redox pair is dissolved, to decouple the hydrogen evolution reaction from the reaction at the opposite electrode (e.g., the OER of conventional direct water electrolysis). Electrical energy delivery, hydrogen generation, electrolyte regeneration, or combinations thereof can be performed by logically or physically separated unit operations in a continuous manner, batch manner, or semi-batch manner. Each species of the energy-bearing redox pair is associated with a standard electrode potential within the water electrolysis voltage window of a particular electrolyte (e.g., acidic, neutral, or alkaline) and on the particular surface of the electrode materials used. Systems and methods described herein can deliver electrical energy for long-durations and/or produce $H_2$ at a much lower voltage and with improved efficiency than that of other systems, resulting in a lower operating cost and stable, long-term energy delivery. Furthermore, since it operates under low cell voltages, it provides flexibility in using lower cost materials. In certain embodiments, the round-trip (charge and discharge, or energy storage and release) efficiency is greater than 70% for long-duration energy storage (LDS) of 8~200 hours.

Figure 1:
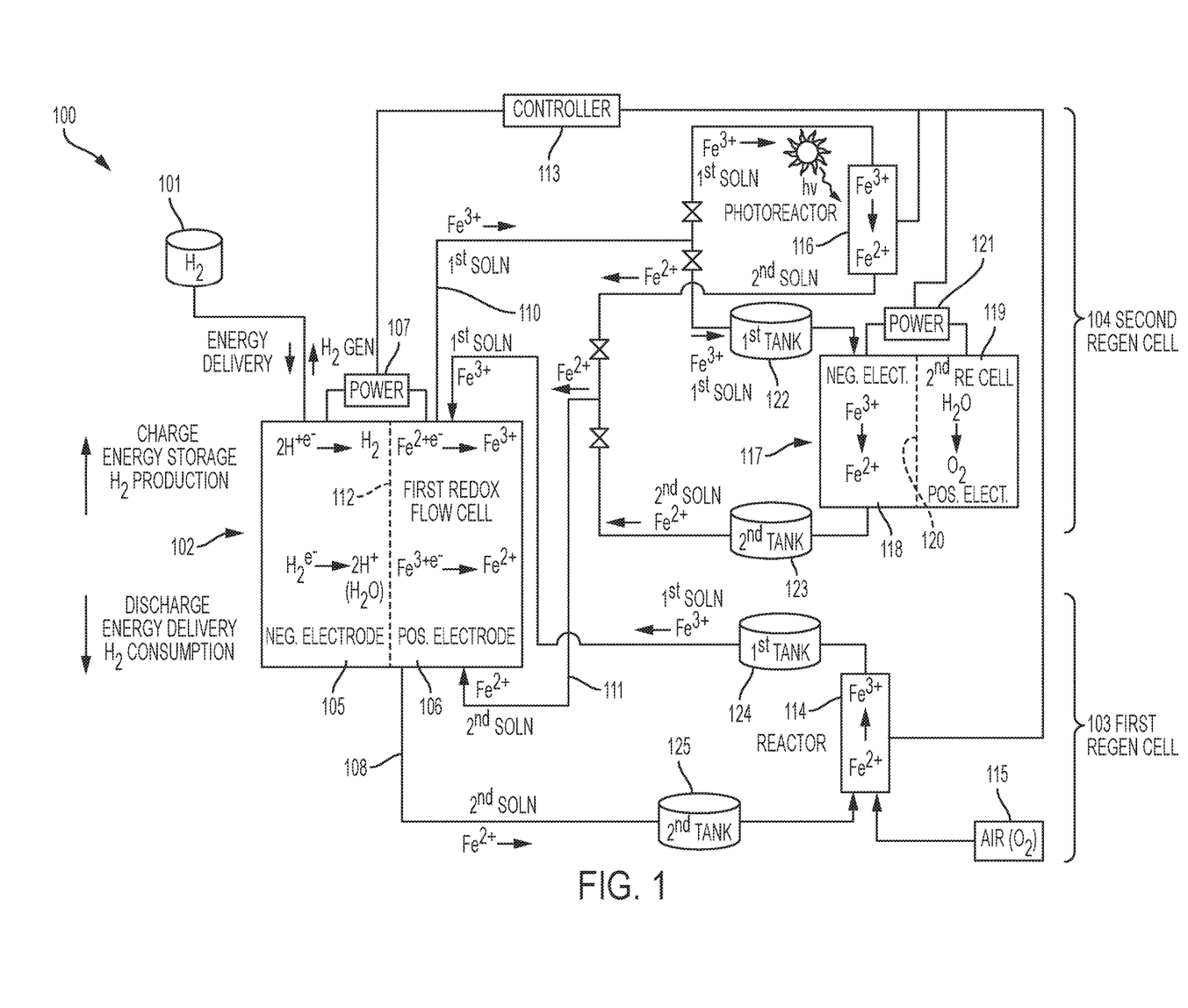
FIG. 1 is an illustration of a long-duration energy storage system according to embodiments described herein.

Referring to FIG. 1, a schematic diagram illustrates one embodiment of a long-duration electrical energy delivery system 100 utilizing an energy-bearing redox pair and comprising a first redox flow cell 102, a first electrolyte regeneration cell 103, and a second electrolyte regeneration cell 104. The energy-bearing redox pair comprises an oxidized species and a reduced species and bears energy for a duration in order to facilitate a decoupling of the hydrogen and oxygen evolving and/or consuming aspects of a conventional electrolysis system into two or more independent unit operations (e.g., redox flow cells, flow reactors, photocatalytic reactors, and chemical/biological reactors). The first redox flow cell has a positive electrode side 106 comprising an energy-bearing redox species dissolved in a liquid, energy-bearing, electrolyte solution. A negative electrode side 105 comprises a $H^+/H_2$ half-cell. A proton-permeable membrane 112 separates the positive and negative electrode sides. The first redox flow cell can be operated in a hydrogen generation mode or in an electrical energy delivery mode. The operating mode can be determined by a controller 113, which can determine the application of a potential 107 across the positive and negative electrode sides.

In certain embodiments, the liquid electrolyte solution can comprise a solvent including, but not limited to, water, etc. The liquid electrolyte can be in acidic, neutral, or alkaline. Examples of acids, neutrals, and bases dissolved in the solution can include, but are not limited to, HCl, $H_2SO_4$, NaCl, KCl, NaOH, and KOH. As illustrated, the energy-bearing redox pair comprises $Fe^{3+}$ and $Fe^{2+}$. An electrolyte solution based on the Fe redox pair can comprise $FeCl_2$ and/or $FeSO_4$ dissolved in a solution also having HCl, $H_2SO_4$, or both dissolved therein. In some embodiments, the concentration of dissolved Fe ions can be less than or equal to 6M and greater than or equal to 0.3M. The concentration of Cl-based ions, $SO_4$-based ions, or both can be less than or equal to 10M.

In certain embodiments, the electrodes of the first and/or second redox flow cells can comprise carbonaceous materials including, but not limited to, carbon, carbon fiber, carbon felt, carbon nanotubes, and graphene materials, especially when acidic liquid electrolytes are used. When a neutral or alkaline liquid electrolyte is used, metals, including but not limited to porous metals, metal fibers, and metal fiber felts, can also be used. In certain embodiments, a heterogeneous catalyst can be employed in the positive electrode side of the first redox flow cell, the negative electrode side of the second redox flow cell, the first regen cell, and/or the photoreactor. An example of a heterogeneous catalyst includes, but is not limited to platinum metal.

Examples of proton-permeable membranes can include, but are not limited to, perfluorosulfonic acid membranes and other fluorinated or non-fluorinated hydrocarbon membranes. Anion exchange membranes can be used in the system, especially when an alkaline electrolyte is used. These also include fluorinated or non-fluorinated hydrocarbon membranes. A separator can also be used, including but not limited to $PTFE/SiO_2$, $PVDF/SiO_2$, PVC and $PE/SiO_2$ separators.

As illustrated in FIG. 1, the energy-bearing redox species in the reduced and oxidized states comprise $Fe^{2+}$ and $Fe^{3+}$, respectively. Although the $Fe^{2+}/Fe^{3+}$ energy-bearing redox pair has the benefit of low-cost and fast kinetics, it is included in the illustration as an example. Other redox species having standard electrode potentials within the water electrolysis voltage window of the particular electrolyte (e.g., acidic, neutral, or alkaline) and on the particular surface of the electrode materials used, including metal, non-metal, inorganic, and organic. Examples can include, but are not limited to iodine, vanadium, $Br_2$, $Cl_2$, and $(CH_2)_3(CMe_2)_2NO$ (i.e., TEMPO). For instance, redox pairs (i.e., redox species in reduced and oxidized states) can include, but are not limited to, $Br_2/Br^-$, $I_3^-/I^-$, and $V^3/VO^{2+}$.

In the electrical energy delivery mode, the first redox flow cell generates electrical energy from hydrogen supplied from a hydrogen source 101. On the positive electrode side, the energy-bearing redox species is reduced. The spent electrolyte comprising the energy-bearing redox species in the reduced state is transferred 108 to the first electrolyte regeneration cell 103, where the energy-bearing redox species is oxidized to enable long-duration electrical energy delivery and hydrogen consumption. As illustrated, the first redox flow cell can be described by the following half reactions:

Negative electrode side: $½H_2(g) \rightarrow H^+ + e^-$ $E^0 = 0V$

Positive electrode side: $Fe^{3+} \rightarrow Fe^{2+} - e^-$ $E^0 = 0.77V$

In certain embodiments, the first electrolyte regeneration cell 103 comprises a flow reactor 114 in which oxygen and the spent, liquid electrolyte solution are reacted. In certain embodiments, the oxygen can be provided as a gas 115 that is bubbled through the liquid electrolyte. The gas can be air or a gas comprising concentrated oxygen. Regenerated electrolyte comprising the energy-bearing redox species in the oxidized state can be returned 109 to the first redox flow cell. As illustrated, the flow reactor can be described by the following reaction:

Oxidation: $Fe^{2+} + O_2 + H^+ \rightarrow ½H_2O + Fe^{3+}$

In the hydrogen storage operating mode, a potential is applied across electrodes of the positive and negative electrode sides and the first redox flow cell 102 utilizes electrical energy to generate hydrogen, which can be stored in a supply 101. The positive electrode side oxidizes the energy-bearing redox species. Spent electrolyte comprising the energy-bearing redox species in the oxidized state is transferred 110 to the second electrolyte regeneration cell 104, which regenerates the spent, liquid electrolyte by reducing the energy-bearing redox species. As illustrated, the first redox flow cell in the hydrogen generation mode can be described by the following half reactions.

Negative electrode side: $H^+ + e^- \rightarrow ½H_2(g)$ $E^0 = 0V$

Positive electrode side: $Fe^{2+} - 1e^- \rightarrow Fe^{3+}$ $E^0 = 0.77V$

The second electrolyte regeneration cell 104 can comprise a photoreactor 116, a second redox flow cell 117, or both. The photoreactor 116 can comprise a heterogeneous photocatalytic reactor, wherein the energy-bearing redox species in the oxidized state is photocatalytically reduced in the presence of a semiconductor material. Examples of semiconductor materials can include $TiO_2$, Silicon, and GaAs. As illustrated, the photoreactor can be described by the following reaction:

Regeneration: $Fe^{3+} + ½H_2O + hv \xrightarrow{TiO_2}$

-continued
$Fe^{2+} + ¼O_2 + H^+$

A second redox flow cell 117 can comprise a negative electrode side 118 in which the energy-bearing redox species is reduced, and a positive electrode side 119 comprising an oxygen evolution reaction half-cell. The negative and positive electrode sides can be separated by a proton permeable membrane 120. Electrolyte regeneration occurs when a potential is applied 121 across electrodes of the second redox flow cell. As illustrated, the second redox flow cell can be described by the following half reactions:

Negative electrode side: $Fe^{3+} + 1e^- \rightarrow Fe^{2+}$ $E^0 = 0.77V$

Positive electrode side: $½H_2O \rightarrow ¼O_2 + H^+ 1e^-$ $E^0 = 1.23V$

According to certain embodiments, the second redox flow cell can utilize electrolyte storage tanks 122 and 123, which further facilitate decoupling of the hydrogen and oxygen evolution reactions. A first storage tank 122 can contain a first liquid, energy-bearing electrolyte solution comprising energy-bearing redox species in the oxidized state. A second storage tank 123 can contain liquid, energy-bearing electrolyte solution comprising energy-bearing redox species in the reduced state. The volumes of the storage tanks can be scaled to meet hydrogen generation and storage needs to maximize the cost benefit.

The inventors determined that decoupling the hydrogen and oxygen redox reactions from being in the same reaction cell, gives the system flexibility to overcome the sluggish high overpotential oxygen reaction (i.e., slow reaction kinetics) and to decrease energy consumption by lowering the reaction voltage. Accordingly, while the total potential applied for hydrogen generation and electrolyte regeneration can be similar to that required for traditional electrolysis, embodiments described herein are enabled to perform the hydrogen generation during first energy-market conditions. Electrolyte regeneration can be performed at a different time when the energy-market conditions are advantageous for regeneration. For example, the electrolyte can be regenerated while hydrogen demand is low, electrical energy prices are relatively lower, and/or grid health can be improved by utilizing excess energy (for example, during wind or solar curtailment). Similarly, hydrogen generation can occur while hydrogen demand is high, electrical energy prices are low, and/or grid health can be improved by utilizing excess energy.

Based on results from a Hydrogen Analysis (H2A), in spite of the progress in recent years to reduce costs, hydrogen production via water electrolysis still faces significant challenges in meeting future production and delivery goals with regard to cost per gasoline gallon equivalent (gge) and/or minimum energy storage duration. The model shows that the cost of hydrogen for both forecourt and central production will exceed four dollars per gasoline gallon equivalent even in 2025 assuming current technology development trends. The challenge is not only capital cost but also operating feedstock costs, which can limit energy storage and delivery capacity of systems based on hydrogen (i.e., systems underprovide energy relative to expectations).

The redox reactions between the hydrogen generating side and the energy-bearing redox pair side of the redox flow cell allow for hydrogen production at much lower voltages and with improved efficiency compared to traditional water electrolysis systems, which often operate at 1.8 volts or higher (including an overpotential). In one example, the energy-bearing redox pair comprises $Fe^{2+}$ and $Fe^{3+}$. The primary cost drivers for $H_2$ production is the feedstock fuel (65%-80%), which is mainly the electricity. The theoretical equilibrium voltage of a $H_2$/Fe flow cell is 0.77 V, which is a 37% reduction from that of current water electrolysis (i.e., 1.23 V).

The explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximations unless the word "about" is recited.

Examples and Comparisons

To further illustrate certain embodiments of the disclosed long-duration electrical energy delivery and hydrogen generation systems and methods, and to provide various comparative analyses and data, below are some examples with comparison test data.

Figure 2A:
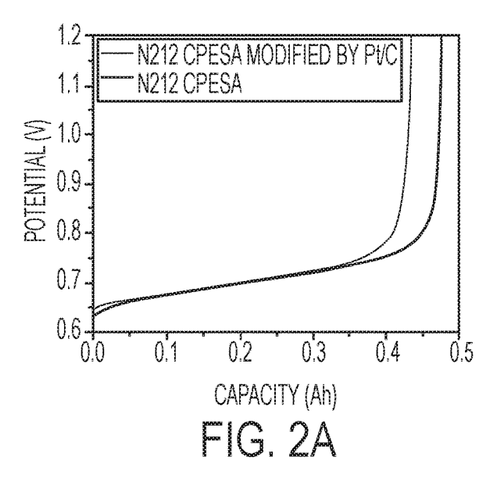
FIGS. 2A and 2B include potential versus capacity graphs of a first redox flow cell operated in a hydrogen generation mode at low voltage (<1 V) and at two different conditions (100 and 300 $mA/cm^2$, respectively) according to some embodiments described herein.
Figure 2B:
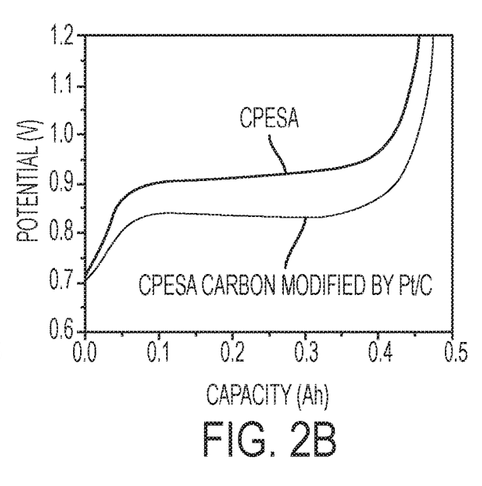

According to embodiments described herein, a first redox flow cell comprised $H_2/H^+$ and $Fe^{3+}/Fe^{2+}$ redox reactions at the negative and positive half-cells, respectively. An interdigitated flow field was used with carbon based a CPESA electrode at the positive half-cell side. A gas diffusion electrode (GDE) with 0.2 mgPt/cm² loading was used as the hydrogen electrode. A Nafion 212 membrane separated the positive and negative electrode sides. Pristine and catalyst modified CP-ESA carbon electrodes were used at the positive electrode side. The catalyst modified CPESA electrode comprised 20 wt % of Pt/C catalyst drop-coated onto the CPESA electrode (0.01 mgPt/cm² loading). The energy-bearing electrolyte solution comprised 1 M $FeSO_4$+2.5M $FeSO_4$ and was flowed through the redox flow cell at a baseline flow rate equal to approximately 60 mL/min. FIGS. 2A-2B show data acquired while charging the redox flow cell (i.e., generating hydrogen) at 100 mA/cm² (FIG. 2A) and 300 mA/cm² (FIG. 2B). Since the test flow cell related to FIG. 2 was not connected to an electrolyte regeneration cell and the $Fe^{3+}/Fe^{2+}$ electrolyte solution was continuously circulated through the cell, a steady increase of the voltage is observed. The increase is due to the depletion of $Fe^{2+}$ as the redox reactions continue.

Figure 3:
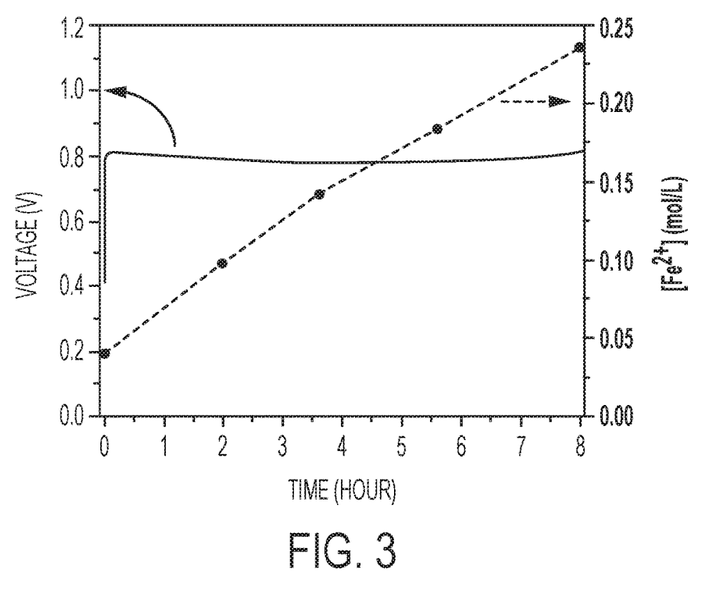
FIG. 3 is a graph of voltage as a function of time for a first redox flow cell operated in a hydrogen generation mode and connected to an electrolyte regeneration cell comprising a heterogeneous photocatalytic reactor. The dashed line represents the $Fe^{2+}$ concentration change and the solid line represents the voltage profile.

Continuous production of $H_2$, and thus the continuous storage of fuel for electricity, is accomplished by coupling a $Fe^{2+}$ regeneration cell. Examples of different kinds of regeneration cells include but are not limited to, photocatalytic regeneration, electrochemical regeneration, chemical regeneration, and biological/microbiological regeneration. As illustrated in FIG. 1, heterogeneous photocatalytic reduction of the $Fe^{3+}$ to $Fe^{2+}$ is environmentally friendly and has a low operational cost. FIG. 3 shows the voltage profile of the first redox flow cell in a hydrogen generation operating mode that is connected to a photocatalytic regeneration cell for regeneration of the electrolyte solution. Contrary to the voltage curve in FIG. 2, the voltage profile shows a flat line validating the continuous storage of fuel for electricity by hydrogen generation while the oxidized $Fe^{3+}$ is continuously reduced photocatalytically to $Fe^{2+}$ and circulated back to the first redox flow cell for hydrogen generation. The voltage profiles were acquired over a period of 8 hrs of continuous operation. The black line depicts the voltage at an equivalent current density of 10 mA/cm² and the dashed line depicts the $Fe^{2+}$ concentration change over the 8 hour duration. The ratio of the photoelectrode area to the hydrogen electrode area was 1:1. The electrolyte was 0.8 M $Fe_2(SO_4)_3$ dissolved in an aqueous solution of 2.8M $H_2SO_4$.

Figure 4A:
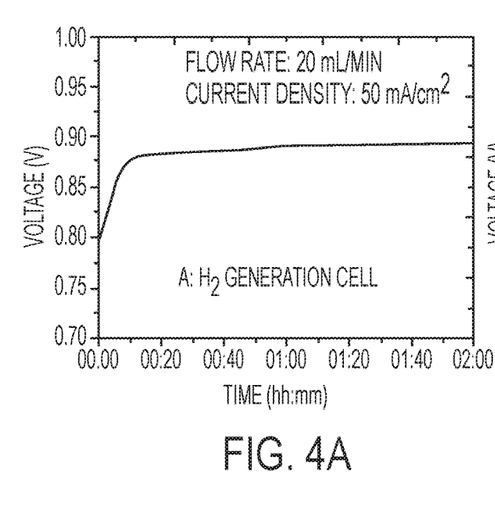
FIGS. 4A and 4B are graphs of voltage as a function of time for a first redox flow cell operated in a hydrogen generation mode and connected to an electrolyte regeneration cell comprising a second redox flow cell.
Figure 4B:
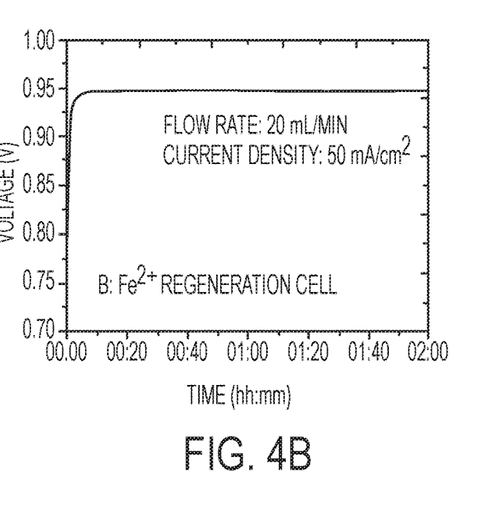

Additional kinds of cells can be utilized in addition to, or in place of the photocatalytic reactor. For example, the reduction can be done electrochemically in a second redox flow cell as illustrated in FIG. 1. Referring to FIGS. 4A and 4B, test data is shown for first and second flow cells in which hydrogen generation and electrolyte regeneration are decoupled via the energy-bearing redox pair dissolved in an electrolyte solution. The total current and electrolyte flow rate of both cells were set to 0.5 A and 20 mL/min, respectively. Electrolyte regeneration can also be performed chemically. For example, the $Fe^{3+}$ can be reacted with reducing agents including, but not limited to carbohydrate compounds, formic acid, citric acid, and glucose in a reactor.

Figure 5:
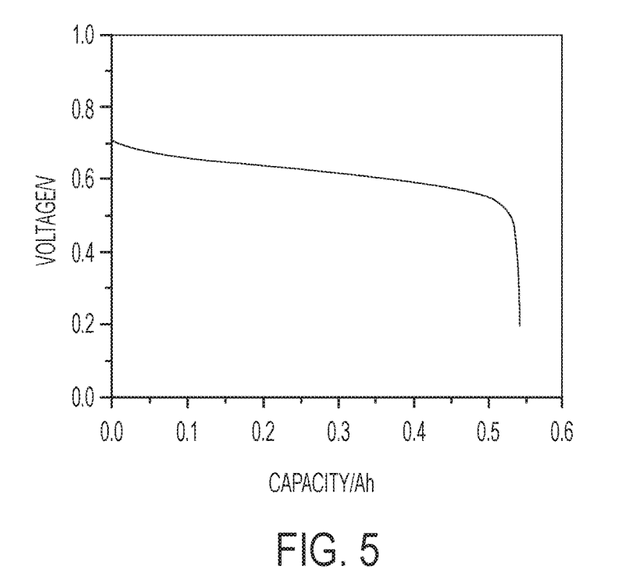
FIG. 5 is a graph of voltage as a function of time for a first redox flow cell operated in an electrical energy delivery mode. The cell was operated at 100 $mA/cm^2$ with an interdigitated flow field and Nafion 212 membranes. A gas diffusion electrode was used in the hydrogen electrode with 0.2 mg Pt/cm² loading on woven carbon paper. The electrolyte comprised 1M $FeSO_4$ and 2.5M $H_2SO_4$ dissolved in an aqueous solution and was circulated at a rate of 60 ml/min.

In an electrical energy delivery mode, the flow cell can be provided with stored hydrogen gas and the energy-bearing electrolyte solution. FIG. 1 shows the schematics for a redox process that converts the energy stored in the hydrogen bond to electricity through a first redox flow cell. FIG. 5 shows experimental data using a similar redox flow cell having a $H^+/H_2$ half cell at the negative electrode side, and a $Fe^{3+}/Fe^{2+}$ half cell at positive electrode side. The flow cell delivers most of the capacity at a voltage greater than 0.6 V and at a current density of 100 mA/cm². The flow cell used for testing was not connected to a regeneration cell. Therefore, as the $Fe^{3+}/Fe^{2+}$ electrolyte continuously circulating through the system, a decrease of the voltage is observed since the $Fe^{3+}$ is being depleted as the redox reactions continue. A carbon based CPESA electrode was used in the test flow cell.

Figure 6:
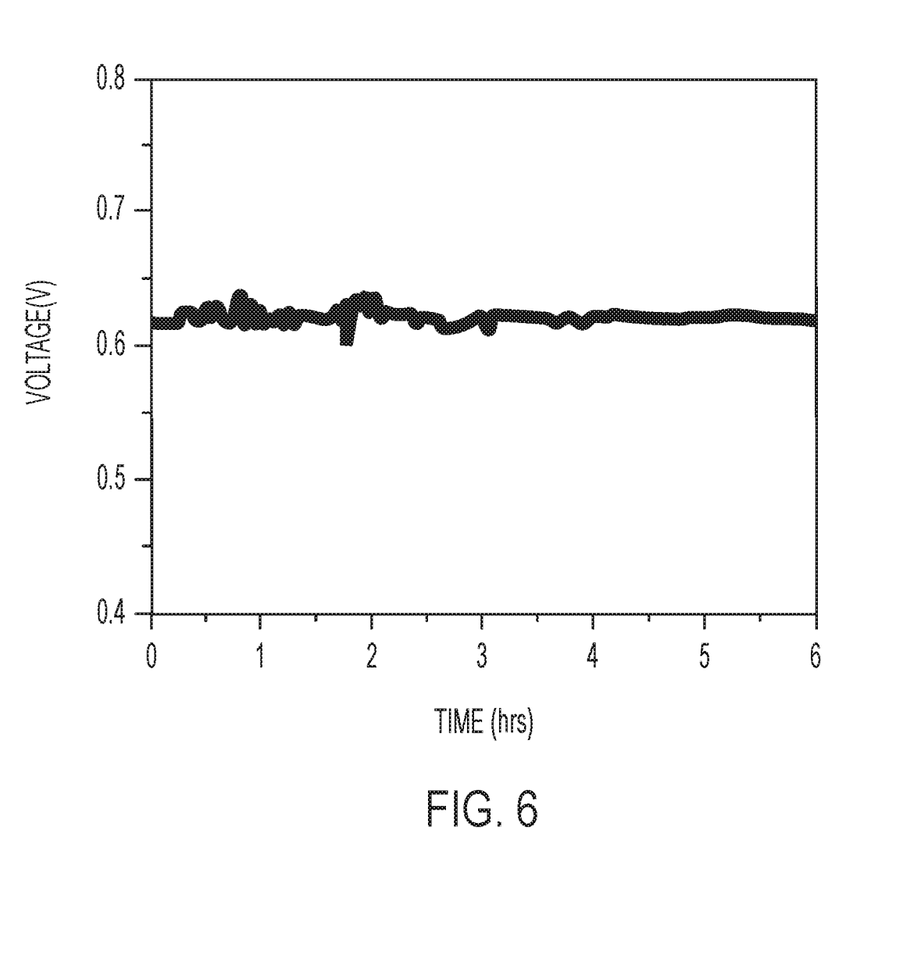
FIG. 6 is a graph of voltage as a function of time for a first redox flow cell operated in an electrical energy delivery mode and connected to an electrolyte regeneration cell comprising a flow reactor in which air is bubbled through the liquid electrolyte. The flow cell was operated at 100 mA/cm² with interdigitated flow field and Nafion 212 membranes. The electrolyte comprised 1M $FeSO_4$ and 2.5M $H_2SO_4$ dissolved in an aqueous solution and circulated at a rate of 40 ml/min.

For long durations of energy delivery, large amounts of electrolyte would be required. Alternatively, the energy-bearing electrolyte can be regenerated during energy delivery. Referring to FIG. 1, a first regeneration cell can be used to oxidize $Fe^{2+}$. As illustrated, $Fe^{3+}$ regeneration occurs in a flow reactor based on air oxidation of the $Fe^{2+}$ ions in the electrolyte to regenerate the $Fe^{3+}$ ions at extremely low cost. This enables continuous operation of the system by overcoming the limit of liquid electrolyte volume. FIG. 6 shows the experimental data acquired during electricity delivery with air regeneration of the energy-bearing electrolyte solution. The voltage profile is shown for the flow cell at energy delivery mode at 100 mA/cm$^2$ having an interdigitated flow field and Nafion 212 membranes. The electrolyte solution comprised 1M FeSO$_4$ and 2.5M H$_2$SO$_4$ at a 40 ml/min circulation rate. The regeneration of Fe$^{2+}$ was performed by bubbling air into the electrolyte circulating through the flow reactor cell. In contrast to the voltage curve in FIG. 5, the voltage profile in FIG. 6 shows a constant voltage for at least six hours, validating the continuous production of electricity by the first redox flow cell as the reduced Fe$^{2+}$ is continuously oxidized by oxygen in the flow reactor, through which air was being bubbled into the spent electrolyte circulating through the regeneration cell.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A system for storing energy, the system comprising:
   a first redox flow cell comprising:
      a positive electrode side comprising a redox species dissolved in a liquid electrolyte solution;
      a negative electrode side comprising a H$^+$/H$_2$ half-cell, and
      a proton permeable membrane separating the positive electrode and negative electrode sides, the first redox flow cell having a hydrogen generation mode and an electrical energy delivery mode;
   a first electrolyte regeneration cell operatively coupled to the positive electrode side of the first redox flow cell, the first electrolyte regeneration cell comprising:
      a reactor configured to react the liquid electrolyte solution comprising the redox species in a reduced state with an oxidizing agent to yield the redox species in an oxidized state and provide the redox species in the oxidized state to the positive electrode side of the first redox flow cell;
   a second electrolyte regeneration cell operatively coupled to the positive side of the first redox flow cell, the second electrolyte regeneration cell comprising:
      a photoreduction cell having a photo-sensitive reducing agent, wherein the photoreduction cell is configured to receive solar radiation and to react the liquid electrolyte solution comprising the redox species in an oxidized state with the photo-sensitive reducing agent to yield the redox species in a reduced state and provide the redox species in the reduced state to the positive electrode side of the first redox flow cell; and
   a controller operatively engaged with the first redox flow cell, the first electrolyte regeneration cell, and the second electrolyte regeneration cell.

2. The system of claim 1 further comprising a circulation sub-system configured to transfer a first liquid electrolyte solution comprising the redox species in the oxidized state from the positive electrode side of the first redox flow cell to the photoreduction cell, and configured to transfer a second liquid electrolyte solution comprising the redox species in the reduced state from the photoreduction cell to the positive electrode side of the first redox flow cell.

3. The system of claim 2 wherein the second electrolyte regeneration cell further comprises a second redox flow cell comprising:
   a negative electrode side comprising the redox species dissolved in the liquid electrolyte solution, the negative electrode side operatively coupled to the positive side of the first redox flow cell;
   a positive electrode side comprising a H$_2$O/O$_2$ half-cell; and
   a proton permeable membrane separating the positive electrode and negative electrode sides, the second redox flow cell configured to reduce the redox species and yield O$_2$.

4. The system of claim 3 further comprising one or more valves operatively aligned between the positive side of the first redox flow cell and both the photo reduction cell and the second redox flow cell.

5. The system of claim 2 wherein the circulation sub-system further comprises a first storage container configured to store a portion of the first liquid electrolyte solution and a second storage container configured to store a portion of the second liquid electrolyte solution.

6. The system of claim 1 wherein the controller is operably connected to the first redox flow cell and configured to select between the energy delivery mode and the hydrogen generation mode based on an energy-market condition.

7. The system of claim 6 wherein the energy-market condition comprises price of electrical energy supply, electrical energy demand, power grid health, H$_2$ price, H$_2$ demand, time of day, weather conditions, or a combination thereof.

8. The system of claim 1 wherein the redox species in the reduced and oxidized states comprise Fe$^{2+}$ and Fe$^{3+}$, respectively.

9. The system of claim 1 wherein the oxidizing agent comprises oxygen.

10. The system of claim 1 wherein the reactor comprises a flow reactor.

11. The system of claim 1 wherein the redox species comprises iodine, vanadium, bromine, chlorine, or TEMPO.

12. The system of claim 1 further configured to operate in the energy delivery mode for a duration of 6 hours, 8 hours, 12 hours, 24 hours, or 48 hours.

* * * * *

UNITED STATES PATENT AND TRADEMARK OFFICE
CERTIFICATE OF CORRECTION

| | |
|---|---|
| PATENT NO. | : 11,043,686 B2 |
| APPLICATION NO. | : 15/988192 |
| DATED | : June 22, 2021 |
| INVENTOR(S) | : Wei Wang et al. |

It is certified that error appears in the above-identified patent and that said Letters Patent is hereby corrected as shown below:

On the Title Page

Item (63) Related U.S. Application Data, 1st Column, 23rd Line - Replace:
"filed on Jan. 22, 2016, now Pat. No. 10,950,883."
With:
--filed on Jan. 22, 2016, now Pat. No. 11,050,076.--

Item (56) References Cited, page 2, 1st Column, 33rd Line - Replace:
"9,214,885 B1 12/2015 Wang et al."
With:
--9,214,695 B1 12/2015 Wang et al.--

Item (56) References Cited, page 2, 2nd Column, 5th Line - Replace:
"molecular metal oxide redox mediatior in water splitting, Science,"
With:
--molecular metal oxide redox mediator in water splitting, Science,--

Item (56) References Cited, page 2, 2nd Column, 10th Line - Replace:
"Aaron et al., "Dramatic Performance Gains in vanadium Redox""
With:
--Aaron et al., "Dramatic Performance Gains in Vanadium Redox--

Item (56) References Cited, page 2, 2nd Column, 13th Line - Replace:
"Alon et al., "Fesibility Study of Hydrogen/Iron Redox Flow Cell for"
With:
--Alon et al., "Feasibility Study of Hydrogen/Iron Redox Flow Cell for--

Item (56) References Cited, page 2, 2nd Column, 27th Line - Replace:
"Electrochemicl Society vol. 152, 2005, United States, pp. A467-"

Signed and Sealed this
Nineteenth Day of July, 2022

*Katherine Kelly Vidal*
Katherine Kelly Vidal
*Director of the United States Patent and Trademark Office*

CERTIFICATE OF CORRECTION (continued)
U.S. Pat. No. 11,043,686 B2

With:
--Electrochemical Society vol. 152, 2005, United States, pp. A467- --

Item (56) References Cited, page 2, 2nd Column, 29th Line - Replace:
"Ayers et al., "Research Advances Towards Low Cost, High Efficincy"
With:
--Ayers et al., "Research Advances Towards Low Cost, High Efficiency--

Item (56) References Cited, page 2, 2nd Column, 46th Line - Replace:
"Ayers, "Low-Noble-Metal-Content Catalysts/Elecfrodes for Hydro-"
With:
--Ayers, "Low-Noble-Metal-Content Catalysts/Electrodes for Hydro- --

Item (56) References Cited, page 3, 1st Column, 11th Line - Replace:
"Debe et al., "Initial Performance and Durability of Ultra-Lowe"
With:
--Debe et al., "Initial Performance and Durability of Ultra-Low--

Item (56) References Cited, page 3, 1st Column, 21st Line - Replace:
"fileadmin/files/library/publications/statistis/Wind_in_power_2011_"
With:
--fileadmin/files/library/publications/statistics/Wind_in_power_2011_--

Item (56) References Cited, page 3, 1st Column, 29th Line - Replace:
"Fu et al., "An Integral Proton Conductins SOFC for Simultaneous"
With:
--Fu et al., "An Integral Proton Conducting SOFC for Simultaneous--

Item (56) References Cited, page 3, 1st Column, 30th Line - Replace:
"Productions of Ethylene and Power from Ethane", Chemical Com-"
With:
--Production of Ethylene and Power from Ethane", Chemical Com- --

Item (56) References Cited, page 3, 1st Column, 43rd Line - Replace:
"Membrane Fuel Cells", Journal of Physical Chemistry C vol. 15,"
With:
--Membrane Fuel Cells", Journal of Physical Chemistry C vol. 115,--

Item (56) References Cited, page 3, 2nd Column, 53rd Line - Replace:
"Transdactions vol. 53, 2013, United States, pp. 7-16."
With:
--Transactions vol. 53, 2013, United States, pp. 7-16.--

Item (56) References Cited, page 4, 1st Column, 15th Line - Replace:
"Sciafani et al., "N2 Photoreduction and Phenol and Nitrophenol"

CERTIFICATE OF CORRECTION (continued)
U.S. Pat. No. 11,043,686 B2

With:
--Sclafani et al., "N2 Photoreduction and Phenol and Nitrophenol--

Item (56) References Cited, page 4, 1st Column, 19th Line - Replace:
"Sciafani et al., "Photocatalytic Degradaton of Phenol in Aqueous"
With:
--Sclafani et al., "Photocatalytic Degradation of Phenol in Aqueous--

Item (56) References Cited, page 4, 2nd Column, 1st Line - Replace:
"Toops et al., "Evaluation of Nitrided Titanium Separator Plates or"
With:
--Toops et al., "Evaluation of Nitrided Titanium Separator Plates for--

Item (56) References Cited, page 4, 2nd Column, 26th Line - Replace:
"Wang et al., "Li-Ion Battery wiht LiFePO4 Cathode and Li4Ti5O12"
With:
--Wang et al., "Li-Ion Battery with LiFePO4 Cathode and Li4Ti5O12--

Item (56) References Cited, page 4, 2nd Column, 40th Line - Replace:
"Wei et al., "Polyvinyl Chloride/Silica Nnoporous Composite sepa-"
With:
--Wei et al., "Polyvinyl Chloride/Silica Nanoporous Composite sepa- --

In the Specification

Column 7, Lines 23-25 - Replace:
"Negative electrode side: $½H_2(g) \to H^+ + e^- \; E^0 = 0V$ Positive electrode side: $Fe^{3+} \to Fe^{2+} - e^- \; E^0 = 0.77V$"
With:
--Negative electrode side: $½H_2(g) \to H^+ + e^- \qquad E^0 = 0\;V$ Positive electrode side: $Fe^{3+} \to Fe^{2+} - e^- \qquad E^0 = 0.77\;V$--

Column 8, Lines 15-18 - Replace:
"Negative electrode side: $Fe^{3+} + 1e^- \to Fe^{2+} \; E^0 = 0.77V$ Positive electrode side: $½H_2O \to ¼O_2 + H^+ 1e^- \; E^0 = 1.23V$"
With:
--Negative electrode side: $Fe^{3+} + 1\;e^- \to Fe^{2+} \qquad E^0 = 0.77\;V$ Positive electrode side: $½H_2O \to ¼O_2 + H^+ + 1\;e^- \qquad E^0 = 1.23V$--